March 24, 1953
L. G. LINDSAY
2,632,461
VALVE MECHANISM
Filed Aug. 25, 1950
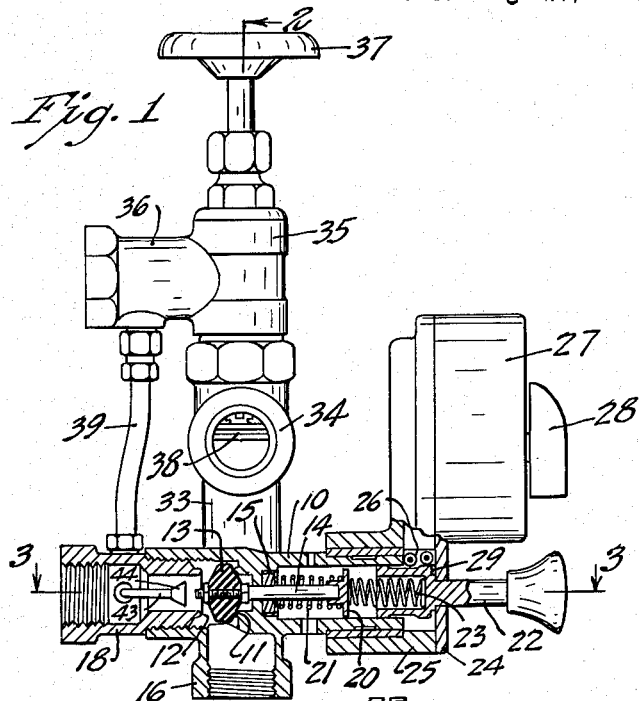
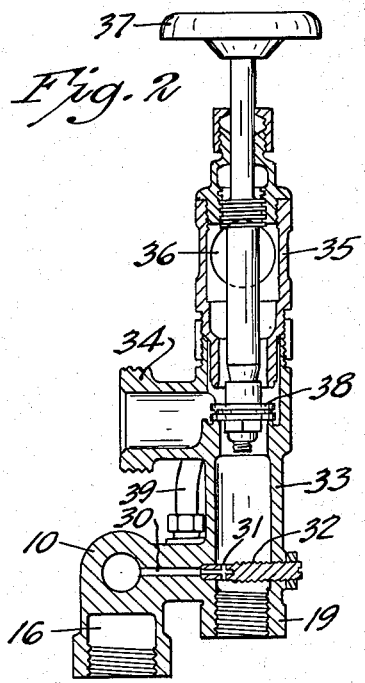
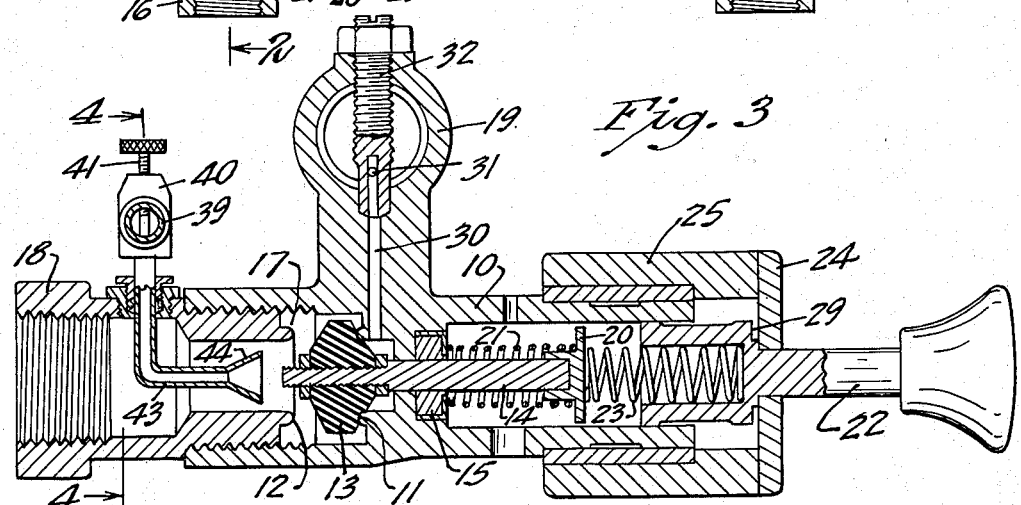
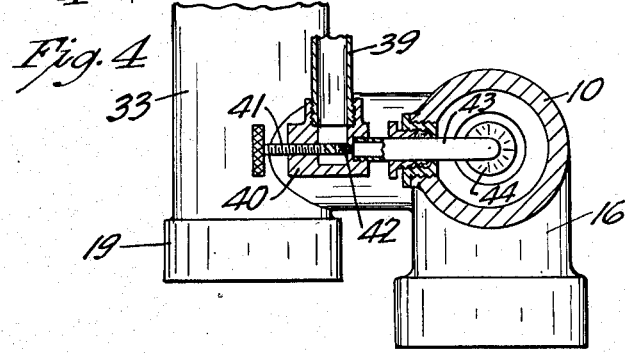
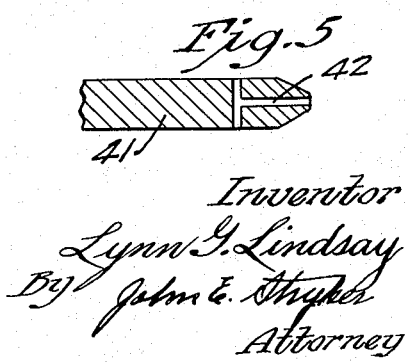
Inventor
Lynn G. Lindsay
By John E. Stryker
Attorney Patented Mar. 24, 1953

2,632,461

UNITED STATES PATENT OFFICE 2,632,461

VALVE MECHANISM

Lynn G. Lindsay, St. Paul, Minn., assignor to The Lindsay Company, St. Paul, Minn., a corporation of Minnesota Application August 25, 1950, Serial No. 181,475

5 Claims. (Cl. 137—112)

This invention relates to valves wherein the closure members for controlling the direction of flow or interrupting the flow of a fluid are subject to back pressure tending to prevent the normal operation of the valves and particularly to means for balancing or controlling back pressure and for eliminating the disadvantages attendant upon by-passing the closure member in order to equalize or control the pressures on opposite faces thereof. The present application is a continuation in part of my application Serial No. 642,847, filed January 23, 1946, for Valve Mechanism.

It is an object of the present invention to provide for a valve of the class described a by-pass conduit whereby water or other fluid under pressure is fed through a restricted or minute passage to the side of the closure member which would otherwise be subject to relatively low pressure when such member is in a closed position and to so locate and form the outlet end of the by-pass conduit as to cause substantial stoppage or interruption of flow through the by-pass when the valve member is in open position and during normal flow of fluid through the valve.

My invention also includes certain novel features of construction which will be more fully pointed out in the following specification and claims.

The accompanying drawing illustrates my invention, by way of example and not for the purpose of limitation, in connection with a valve of the type adapted to be set in one position manually to control the flow of fluid through a conduit and having means for automatically cutting off the flow or changing the direction of flow after the elapse of a predetermined period of time. The valve illustrated is particularly adapted for the control of water softeners.

Referring to the drawing:

Figure 1 is a part side elevational view and part vertical sectional view through a valve embodying my invention;

Fig. 2 is a vertical sectional view taken on the line 2—2 of Fig. 1;

Fig. 3 is a horizontal sectional view taken on the line 3—3 of Fig. 1;

Fig. 4 is a part vertical sectional view taken on the line 4—4 of Fig. 3 and part fragmentary elevational view of the valve, and Fig. 5 is a fragmentary sectional view through a portion of the needle valve on a greatly enlarged scale.

In the drawing the numeral 10 indicates the main casing member of the valve which is formed with suitable passages for conducting the fluid and parallel seats 11 and 12 for engagement with a movable head 13 constituting a closure member. This head is mounted on an end of a longitudinally movable rod 14 having a bearing 15 in the casing. A branch 16 of the casing 10 is adapted to be connected to a fluid supply or inlet pipe and is formed to conduct the fluid to a chamber 17 located between the valve seats 11 and 12. An outlet end portion 18 of the casing 10 is adapted to be connected to a service pipe or other outlet and a side branch 19 is adapted to be connected to a second outlet or drain pipe.

The end of the rod 14 remote from the head 13 has fixed thereon a flange member 20 adapted to confine one end of a helical spring 21 on the rod 14, the opposite end of the spring being confined against the bearing 15. This spring biases the head 13 toward its open position in relation to the seat 12 and closed position in relation to the seat 11. To actuate the valve head to close against the seat 12, a manually operable plunger 22 is operatively connected to the rod 14 by means of a second helical spring 23. The plunger 22 is slidable in a bore in the casing 10 and in an opening in an end plate 24 carried by a housing member 25. This housing member also supports and guides a latch member 26 for retaining the plunger and valve head in an operative position with the head 13 in closed relation to the seat 12. Clock mechanism in a housing 27 is provided to actuate the latch 26 to plunger release position at a predetermined time determined by the setting of a manually operable handle 28. Details of similar clock and latch mechanisms are described in my application for patent Serial No. 52,551 filed October 2, 1948. Other types of time control mechanisms may be substituted for the clock mechanism and latch, e. g. the time control of either of my patents numbered 2,347,202, 2,347,203 or 2,347,204, all granted April 25, 1944, or that of Patent No. 2,507,343, granted May 9, 1950, or that of my application Serial No. 642,847, of which the present application is a continuation in part.

When the plunger 22 is thrust inward manually the head 13 is closed against the seat 12 and the latch member 26 is moved downward by the mechanism operated by the handle 28 to engage a shoulder 29 formed on the plunger 22, thereby retaining the valve head in this closed position for a period of time determined by the clock mechanism. At the end of this period the mechanism in the housing 27 releases the latch member 26 which is thereupon moved upward out of the path of the plunger 22. This allows the spring 21 to expand and to actuate the head 13 to closed position on the seat 11 and open position in relation to the seat 12.

During the period when the valve head 13 is closed against its seat 12, water or other fluid entering through the inlet branch 16 of the casing flows to the chamber 17, past the seat 11, through restricted passages 30 and 31 to the outlet branch 19, the rate of flow being controlled by the size of the passage 31 which is formed in a removable threaded member 32. Upon release of the valve head 13 to the open position in relation to the seat 12 and closed position in relation to the seat 11, shown in full lines in the drawing, water or other fluid entering the chamber 17 passes to the outlet 18.

The valve illustrated is particularly adapted for use in controlling the flow of water to and from a tank containing water softening material. For such use the valve casing 10 is provided with an upper branch 33 extending in continuation of the outlet branch 19 and a laterally extending branch 34 adapted to be connected to the upper portion of the tank containing the water softening material. A valve indicated generally by the numeral 35 is provided to control the flow of hard water entering through a branch 36 of the casing. The valve 35 has a handle 37 for operating a valve head 38 either upward to close communication between the branch 36 and branch 34 or downward to allow hard water to flow into the softener tank through the branch 34 while closing communication between the branch 36 and branch 33.

To provide for back washing the body of water softening material in the tank and also to control the fluid pressure on the front face of the valve head 13 when it is in closed position against its seat 12, a by-pass pipe 39 is arranged to connect the hard water supply branch 36 with the service pipe branch 18 of the casing 10. A needle valve indicated generally by the numeral 40 controls the rate of flow through the pipe 39, being provided with a needle member 41 which is formed with a minute passage 42 extending from its inner extremity to a cross passage so that the pipe 39 is continuously in communication with the outlet passage in branch 18 through this restricted passage. A tubular extension 43 of the pipe 39 extends from the valve 40 within the branch 18 and has a flaring open end portion 44 disposed to direct the by-passed water toward the front face of the valve head 13. The outlet end portion 44 of the tubular extension 43 is substantially conical in shape and its larger open end is disposed in a plane which is perpendicular to the axis of the outlet passage extending from the annular seat 12 so that during the normal flow of water into the branch 18 over the seat 12 back pressure is created in the by-pass pipe 39 and tubular extension 43 sufficient to substantially stop or interrupt the flow through this conduit. It will be evident that the enlarged end portion 44 forms a restriction in the outlet passage which causes increased pressure to be built up in the by-pass during the normal flow to the service outlets.

Operation

The needle valve 40 is normally retained in its closed position indicated in Fig. 4 but may be manually turned to wide open position for backwashing purposes. To backwash the body of water softening material in the tank, the needle valve 40 is opened manually and the valve handle 37 is turned to close the head 38 against its upper seat thereby placing the upper portion of the tank in communication with the drain pipe connected to the branch 19. During the back washing the head 13 is closed against its seat 11 so that wash water enters the bottom of the tank through the by-pass pipe 39, extension 43 and branches 18 and 16 of the valve casing and flows from the upper part of the tank to drain through the branches 36, 33 and 19 of the valve casing. To return the apparatus to the softening phase of operation, the positions of the valves 35 and 40 are reversed, that is to say, the head 38 of the valve 35 is closed against its lower seat and the needle valve 40 is closed except for the restricted passage 42.

During water softening, the head 13 is held in closed relation to the seat 11 by the spring 21 and the valve 35 is closed at its lower seat so that direct communication between the hard water supply branch 36 and the branch 33 of the valve casing is shut off and water under pressure is allowed to flow from the branch 36 through the valve 35 to the branch 34 and thence into the upper portion of the water softening tank containing the zeolite or other softening material. Water is softened as it passes down through the softening material, then flows from the bottom of the tank through suitable connections with the branch 16 of the casing 10 and, the valve head 13 being open with respect to its seat 12, allows the soft water to flow from the chamber 17 past the valve seat 12 and out through the branch 18 to the service outlets. Pressure exerted by the flowing water at the open face of the conical portion 44 creates sufficient back pressure in the by-pass pipe 39 to prevent flow of hard water to the service outlets during the water softening operation.

When it is desired to regenerate the body of softening material, the valve handle 37 is first turned upward to close the head 38 against its upper seat and thereby cut off the flow of hard water to the softener tank, except for the small amount which flows through the by-pass pipe 39 and restricted passage 42 to the branch 18. Sufficient water is now drained from the upper portion of the tank to permit a charge of salt for regenerating purposes to be placed in the tank. The excess water merely flows to the drain branch 19 of the casing 10 through the branch 34 connected to the upper portion of the tank and branch 33. After thus reducing the level of water in the tank, a charge of regenerating material such as common salt or other required reagent, is placed in the tank through an opening in the top thereof having a removable cover and the cover is then secured in place. As the next step the valve handle 37 is turned down to place the hard water supply branch 36 in communication with the upper portion of the tank through the branch 34, and the plunger 22 is actuated to close the head 13 against its seat 12. The head 13 is retained in this position by operation of the latch 26 as a result of suitable manipulation of the handle 28 of the clock mechanism. This handle is set for the time required to regenerate. During the succeeding regenerating treatment of the softening material, water flows into the top of the tank dissolving the regenerating material and carrying it down through the softening material. The spent brine and hardening salts from the softening material are conducted into the branch 16 of the valve casing, thence to the chamber 17 and out to drain through the restricted passages 30 and 31 and branch 19. This operation continues until the softening material has been regenerated and washed.

During regeneration it frequently occurs that the service outlets communicating with the valve casing branch 18 are opened thereby reducing the pressure in the branch 18 and at the front face of the head 13 exposed to this reduced pressure. In the absence of the by-pass pipe 39 or like conduit supplying fluid under pressure to the outlet branch 18, reduction in pressure in this outlet passage would be sufficient to prevent the head 13 from opening in relation to the seat 12 by expansion of the spring 21 at the end of the regeneration period. Upon the closing of the service outlets, water flowing into the branch 18 through the by-pass 39 and extension 43 restores the balance of pressure on opposite faces of the head 13 thereby permitting the spring 21 to expand when released by operation of the timing mechanism and latch member 26. With the valve head open in relation to its seat 12, upon the opening of any service outlet, soft water flowing past the seat 12 to the branch 18 impinges against the open face of the conical member 44 and creates the desired back pressure in the by-pass pipe to prevent the mixing of hard water with the soft water drawn from the service outlets.

It will be evident that my improved mechanism for balancing or controlling the pressure on opposite faces of the valve closure member when in closed position and for interrupting the flow through the by-pass when the valve head is in open position in relation to the seat may be used with various other and different valves without departing from the spirit of the appended claims.

Having described my invention, what I claim as new and desire to protect by Letters Patent is:

1. For a valve having inlet and outlet passages for conducting fluid, a valve member movable to and from a closed position with respect to said outlet passage and having front and back faces subject to different fluid pressures, control means operative to retain said valve member in said closed position for a determined period of time, means for supplying fluid under pressure to said inlet passage and a conduit disposed to supply fluid under pressure to said outlet passage the improvements which comprise, an open end of said conduit disposed to direct fluid toward the front face of said valve member and means restricting said outlet passage adjacent to said open end of the conduit whereby back pressure in said conduit sufficient to substantially interrupt the flow of fluid to the outlet passage through said conduit is established when said valve member is in open position and during the normal flow of fluid through said outlet passage.

2. The improved valve mechanism as defined in claim 1 wherein said means for restricting the outlet passage comprises an enlargement of the said open end of said conduit.

3. The improved valve mechanism as defined in claim 1 wherein said valve member is spring biased toward open position and said control means are operative to release said valve member for movement to open position at the end of a determined period of time.

4. The improved valve mechanism as defined in claim 1 wherein said valve is provided with an annular seat and said valve member is movable perpendicularly to and from closed position on said seat.

5. For a valve having inlet and outlet passages for conducting fluid and a valve member movable to and from a closed position with respect to said outlet passage and having front and back faces, said front face being subject to lower pressure than said back face when the valve member is in said closed position, control means operative to retain said valve member in said closed position, resilient means for actuating said valve member to open position, means for supplying fluid under pressure to said inlet passage and a conduit disposed to supply fluid to said outlet passage under pressure substantially equal to that of the fluid supplied to said inlet passage, the improvements which comprise, means for restricting the flow through said conduit to a small fraction of the normal rate of flow to said outlet passage and a flaring end portion on said conduit disposed to direct flow therefrom toward the front face of said valve member and to cause back pressure tending to interrupt the flow of fluid through said conduit when said valve member is in open position and during the normal flow of fluid through said outlet passage.

LYNN G. LINDSAY.

REFERENCES CITED

The following references are of record in the file of this patent:

UNITED STATES PATENTS

| Number | Name | Date |
| --- | --- | --- |
| 2,347,204 | Lindsay | Apr. 25, 1944 |